(12) United States Patent
Rhee

(10) Patent No.: US 6,572,904 B2
(45) Date of Patent: *Jun. 3, 2003

(54) METHOD AND PACKAGE FOR PACKING FOOD PRODUCTS WITH CALORIE-DIVISION INDICATING FUNCTION

(75) Inventor: Yeong Won Rhee, Seoul (KR)

(73) Assignee: Hanlim Mechatronics Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 28 days.

(21) Appl. No.: 09/385,533

(22) Filed: Aug. 30, 1999

(65) Prior Publication Data

US 2001/0043968 A1 Nov. 22, 2001

(30) Foreign Application Priority Data

Jul. 28, 1999 (KR) ........................................ 1999-30874

(51) Int. Cl.⁷ .............................. A23L 1/00; B65D 65/28
(52) U.S. Cl. .................... 426/87; 426/115; 426/122; 426/383; 426/394; 206/459.5
(58) Field of Search ................................. 426/87, 383, 115, 426/108, 119, 76, 106, 122, 231, 232, 394; 206/459.5; 73/426, 427; 229/87.08, 87.05

(56) References Cited

U.S. PATENT DOCUMENTS

| | | | | |
|---|---|---|---|---|
| 265,735 A | * | 10/1882 | Baxter | 426/87 |
| 397,475 A | * | 2/1889 | Tiffany | 33/1 F |
| 866,243 A | * | 9/1907 | Waechter | 206/459.5 |
| 1,617,472 A | * | 2/1927 | Wyse | 229/152 |
| 2,159,997 A | * | 5/1939 | Millar | 229/87.08 |
| 2,263,835 A | * | 11/1941 | Atkinson | 206/526 |
| 2,340,369 A | * | 2/1944 | Downer | 206/459.5 |
| 2,705,203 A | * | 1/1955 | Heidrich et al. | 426/108 |
| 5,402,679 A | * | 4/1995 | Vogel | 73/427 |
| 5,516,038 A | * | 5/1996 | Zaccarini | 226/162 |
| 5,558,742 A | * | 9/1996 | Kiefer | 156/244.16 |
| 5,704,649 A | * | 1/1998 | Small | 238/81 |
| 5,726,899 A | * | 3/1998 | Ferguson et al. | 364/479.01 |

FOREIGN PATENT DOCUMENTS

| | | | | |
|---|---|---|---|---|
| FR | 2518500 A | * | 6/1983 | ........... B65D/85/72 |
| FR | 2754340 A1 | * | 4/1998 | ........... G01F/19/00 |
| JP | 362093721 A | | 4/1987 | |
| JP | 402241457 A | * | 9/1990 | ................. 422/102 |
| JP | 2000157398 | * | 6/2000 | ........... A47G/19/00 |

* cited by examiner

Primary Examiner—Steve Weinstein
Assistant Examiner—Robert Madsen
(74) Attorney, Agent, or Firm—Mathews, Collins, Shepherd & McKay, P.A.

(57) ABSTRACT

A method and package for packing food products with a calorie-division indicating function is disclosed. In the method, a food product is preliminarily sectioned into a plurality of portions while indicating calorie content on each of the portions prior to packing the product with a package. Thus, people are allowable to consume one or more measured portions containing a desired number of calories. On the other hand, a package for food products are sectioned into a plurality of segments while indicating calories on each of sectioned portions of a packed food product. In the above package, the calorie content is expressed separately on each of the sectioned portions while indicating the calorie content of each portion or total calorie content of partially divided portions. The invention also provides a container for food products, having a calorie scale on its sidewall. In such a case, the calorie scale indicates calorie content of portions of a food product within the container.

6 Claims, 14 Drawing Sheets

| FOR BREAKFAST | | | | | | | |
|---|---|---|---|---|---|---|---|
| 200 CAL | 300 CAL | 400 CAL | 500 CAL | 600 CAL | 700 CAL | 800 CAL | |
| FOR LUNCH | | | | | | | |
| 400 CAL | | 500 CAL | 600 CAL | 700 CAL | 800 CAL | 900 CAL | 1000 CAL |
| FOR SUPPER | | | | | | | |
| 350 CAL | 400 CAL | 500 CAL | 600 CAL | 700 CAL | 800 CAL | 900 CAL | |
| 200 CAL | 300 | 400 | 500 | 600 | 700 | 800 | 900 | 1000 |

*FIGURE 2c*

| 25 CAL | 50 CAL | 75 CAL |
|---|---|---|
| 100 CAL | 125 CAL | 150 CAL |

METHOD AND PACKAGE FOR PACKING FOOD PRODUCTS WITH CALORIE-DIVISION INDICATING FUNCTION

BACKGROUND OF THE INVENTION

1. Field of the Invention

The present invention relates, in general, to a method and package for packing food products with a calorie-division indicating function and, more particularly, to a method of indicating calorie-divided portions on a food product by forming preliminarily divided-portion lines on the product and/or to a package for food products with calorie-division indicating lines formed on the package, thus allowing people to easily and precisely know how many calories they are consuming per portion of the food product.

2. Description of the Prior Art

In the prior art, marketed food products are typically packed by a variety of packages, such as polyethylene wrappers, tetra packs, laminated wrappers, retort wrappers, color or colorless bottles, and aluminum or tin cans. Most conventional packages for food products are designed to effectively pack the food products, with the gross number of calories of each product being expressed on the external surface of each package, and to be suitable for transporting and storing the products. However, neither the marketed food products nor the conventional packages for such products are provided with means for indicating the number of calories for divided portions of each food product.

Therefore, it is almost impossible for people to precisely measure the appropriate amount of food product to be consumed, including a desired number of calories, after opening a package, and so people are forced to consume the food product while measuring the amount of product, corresponding to a desired number of calories, at a guess. This may cause people to consume an exceeding number of or an insufficient number of calories from the food products.

The above-mentioned problems are specifically significant to some people on a calorie-limitrophic program or a diet program due to obesity, diabetes, hypertension and etc.

SUMMARY OF THE INVENTION

Accordingly, the present invention has been made keeping in mind the above problems occurring in the prior art, and an object of the present invention is to provide a method of packing food products while indicating calorie-divided portions of a food product, the method thus allowing people to easily and precisely know how many calories they are consuming per portion of the food product.

Another object of the present invention is to provide a package for food products, which is provided with calorie-division indicating lines on its surface, thus allowing people to easily and precisely know how many calories they are consuming per portion of a packed food product.

A further object of the present invention is to provide a method and package for packing food products with a calorie-division indicating function, which provides a new packaging culture to the food industry.

In order to accomplish the above objects, the present invention provides a method of packing food products, comprising the steps of preliminarily sectioning a food product into a plurality of portions while indicating calorie content on each of the portions prior to packing the product with a package, thus allowing people to consume one or more portions containing a desired number of calories; and/or sectioning the package of a food product into a plurality of segments while indicating calories on each of sectioned portions of the product, thus allowing people to consume one or more portions containing a desired number of calories.

Another embodiment of this invention provides a package for food products, wherein one or more segmented lines, indicating specific portion sizes of a packed food product, are provided on an external surface of the package with a calorie content indicator being expressed on each of segmented portions of the package.

A further embodiment of this invention provides a container for food products, wherein a scale, indicating the calorie content of portions of a food product contained in the container, is provided on the container.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

In the present invention, the total calories of a food product are calculated from the content analysis table of the product. In the case of a processed food product, the food product may be changed in the number of calories while being processed during a heating, frying, steaming, boiling, or fermenting process. Therefore, the total calories of such a processed food product are measured and calculated through a qualitative or quantitative analysis of a completely processed sample. In the case of raw food products, such as agricultural or marine products, the calories are calculated by portions before they are packaged.

In the present invention, the expression of the calorie content indicators on a raw food product or a processed food product is performed as follows. That is, the raw or processed food product may be preliminarily sectioned by calories before it is packaged. Thereafter, the calorie content indicators, indicating the number of calories, for example, 100 calories, 200 calories, 300 calories, . . . , are expressed on each of the preliminarily sectioned portions of the food product. Alternatively, the food product may be preliminarily sectioned into a plurality of calorie-divided portions for breakfast, lunch and supper. As a further alternative, a figure of a packed food product may be drawn on a separate paper packaged along with the food product. In such a case, a plurality of dotted, dashed, or otherwise segmented lines, indicating specific portion sizes of each packed product, are provided on the figure. In addition, Arabic numerals 1, 2, 3 . . . , English characters A, B, C . . . , or Roman numerals of I, II, III . . . are expressed on the segmented portions of the figure, respectively, with a calorie content being expressed on each of the segmented portions of the figure.

In the present invention, the calorie content is expressed separately on each of the sectioned portions of a food product while indicating the calorie content of each portion or total calorie content of partially divided portions.

The present invention also provides a package for food products, wherein one or more segmented lines, indicating specific portion sizes of a packed food product, are provided on a surface of the package with a calorie content being expressed on each of the segmented portions of the package. Such a package thus allows people to easily and precisely know how many calories they are consuming per portion of the food product.

The present invention also provides a variety of packages or containers for liquid food products individually having a calorie scale on a sidewall.

In the present invention, the perforated, dashed, dotted, or otherwise segmented lines, indicating the specific portion sizes, and the calorie scales may be formed on food products, packages or containers through a mechanical process or a thermal process.

The preferred embodiments of this invention will be described hereinbelow with reference to the accompanying drawings.

FIGS. 1a to 1f are views, showing a variety of food products, such as instant noodles, cupped instant noodles, roll cake, length of candy, chocolate, and biscuits, individually having both preliminarily divided-portion lines and calorie content indicators expressed on the divided portions in accordance with the primary embodiment of this invention, thereby allowing people to easily and precisely know how many calories they are consuming per portion of the food product.

That is, FIGS. 1a to 1f respectively show instant noodles, cupped instant noodles, roll cake, length of candy, chocolate and biscuits, individually having both preliminarily divided-portion lines and calorie content indicators expressed on the divided portions.

Figure 1A:
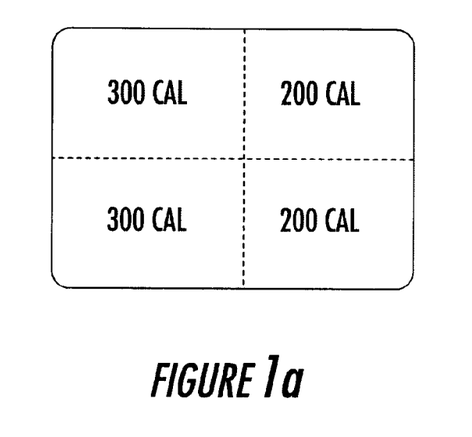
FIGS. 1a to 1f are views, showing a variety of food products, individually having both preliminarily divided-portion lines and calorie content indicators expressed on the preliminarily divided portions in accordance with the primary embodiment of this invention, thereby allowing people to easily and precisely know how many calories they are consuming per portion of a food product.
Figure 1B:
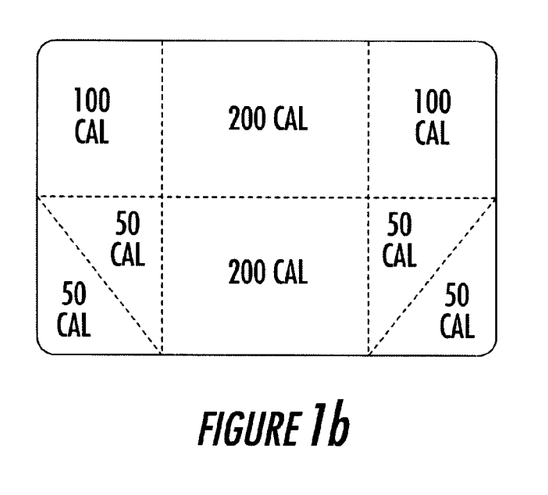
Figure 1C:
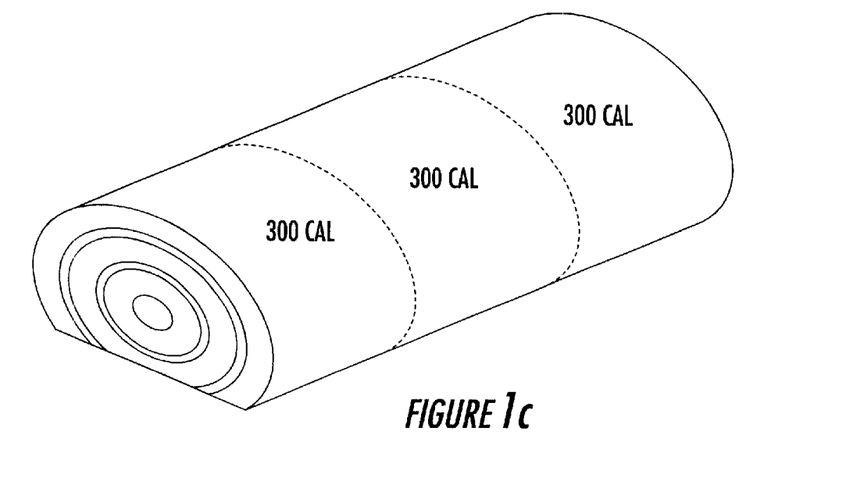
Figure 1D:
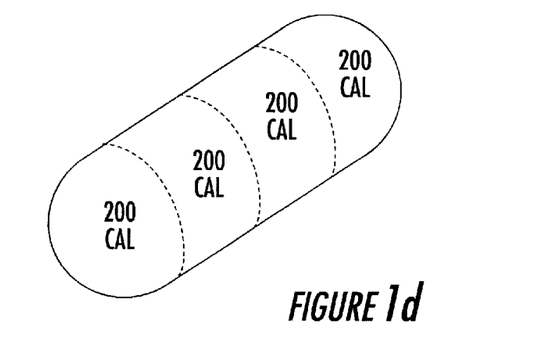
Figure 1E:
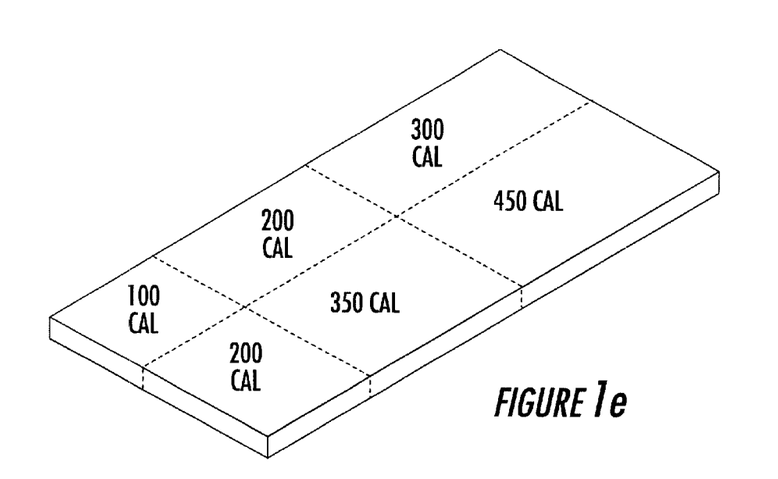
Figure 1F:
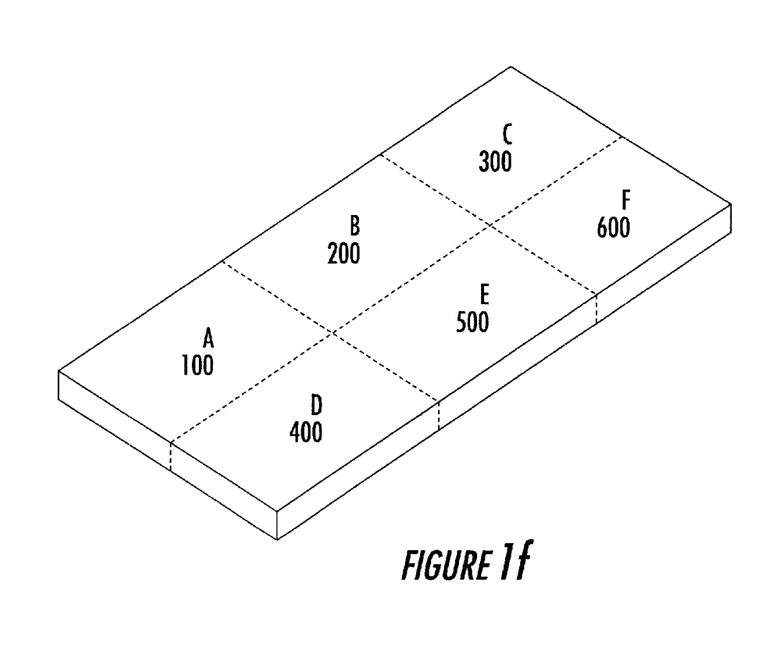
Figure 2A:
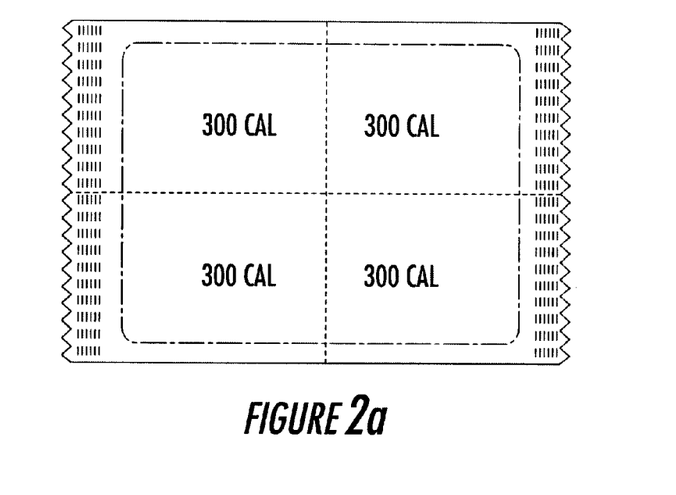
FIGS. 2a to 2e are views, showing a variety of packages for food products, individually having dotted, dashed, or otherwise segmented lines indicating specific portion sizes of each packed food product in accordance with the second embodiment of the invention, thus allowing people to easily and precisely know how many calories they are consuming per portion of the packed food product.
Figure 2B:
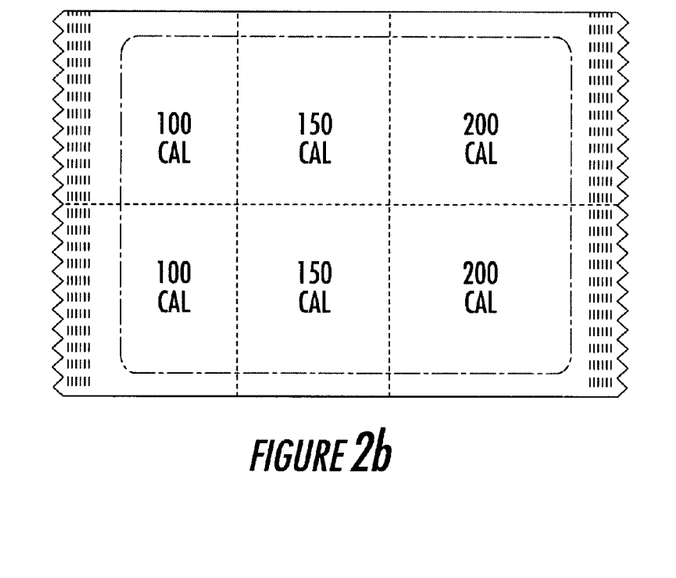
Figure 2C:
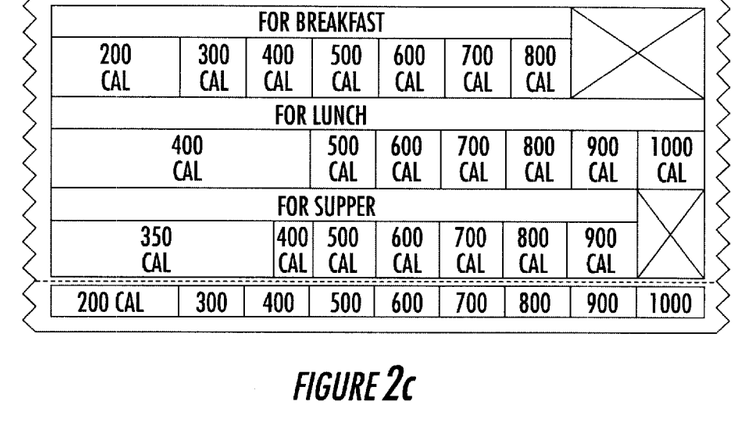
Figure 2D:
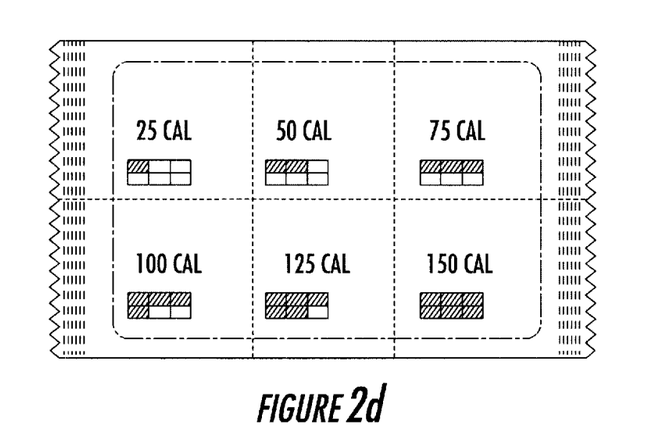

FIGS. 2a to 2e are views, showing a variety of packages for food products, individually having dotted, dashed, or otherwise segmented lines indicating specific portion sizes of each packed product in accordance with the second embodiment of this invention, thus allowing people to easily and precisely know how many calories they are consuming per portion of the food product. FIGS. 2a and 2d show packages for instant noodles. That is, FIG. 2a shows a package for instant noodles, which is segmented into four equal portions, with a calorie content indicator of "300 cal" being expressed on each of the segmented portions in accordance with the first modification of this second embodiment. On the other hand, FIG. 2b shows a package for instant noodles, which is segmented into six different portions, or two 100 calorie portions, two 150 calorie portions, and two 200 calorie portions in accordance with the second modification of this embodiment. In such a case, each of the 100 calorie portions may be expressed with a character A, I or the term "for breakfast". In the same manner, each of the 150 calorie portions may be expressed with a character B, II or the term "for lunch", while each of the 200 calorie portions may be expressed with a character C, III or the term "for supper".

Figure 2E:
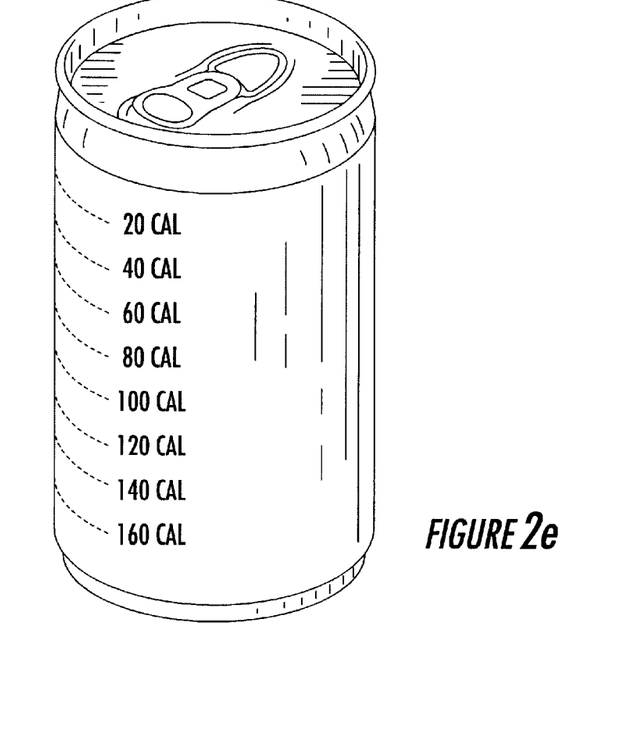

FIG. 2c shows a seasoning package for cupped instant noodles in accordance with the third modification of the second embodiment. This modification shows a method of expressing divided calorie contents on a package for food product containing a total number of 1,000 calories. FIG. 2d show a package for cheese, butter or cookies, containing a total number of 150 calories, in accordance with fourth modification of the second embodiment. Of course, it should be understood that a package for seasoned peanuts, jelly, raisins, walnuts, or ice-cream cones may be expressed with divided calorie contents in the same manner as that described for FIG. 2d. FIG. 2e shows a can for liquid food products, which is expressed with divided calorie contents in accordance with a fifth modification of the second embodiment. Of course, a bottle for liquid food products may be expressed with divided calorie contents in the same manner as that described for FIG. 2e.

FIGS. 3a to 3f are views, showing a variety of packages for food products, individually having dotted, dashed, or otherwise segmented lines indicating specific portion sizes of each packed product and calorie content indicators, indicating the calorie content of each of the sectioned portions or indicating the summed calorie content of partially divided portions in accordance with the third embodiment of the invention.

Figure 3A:
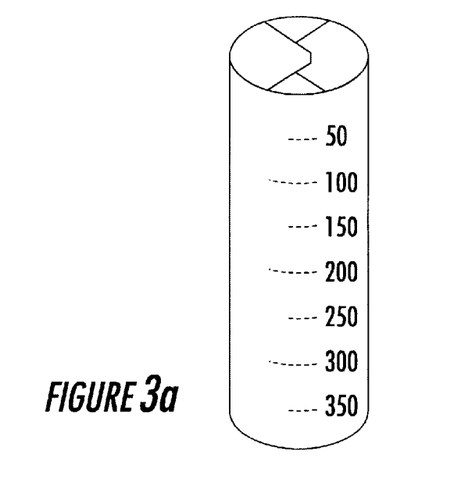
FIGS. 3a to 3f are views, showing a variety of packages for food products, individually having dotted, dashed, or otherwise segmented lines indicating specific portion sizes of each packed product and calorie content indicators, indicating the calorie content of each of the sectioned portions or indicating the summed calorie content of partially divided portions in accordance with the third embodiment of this invention.
Figure 3B:
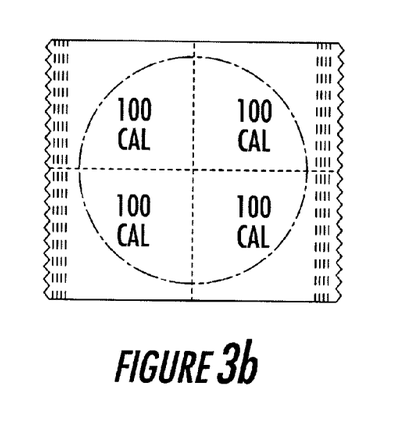

FIG. 3a is a view of a package for cookies, sausages, or biscuits in accordance with the first modification of the third embodiment, while FIG. 3b is a view of a package for bread, cookies, pizza, and hamburgers in accordance with the second modification of the third embodiment.

Figure 3C:
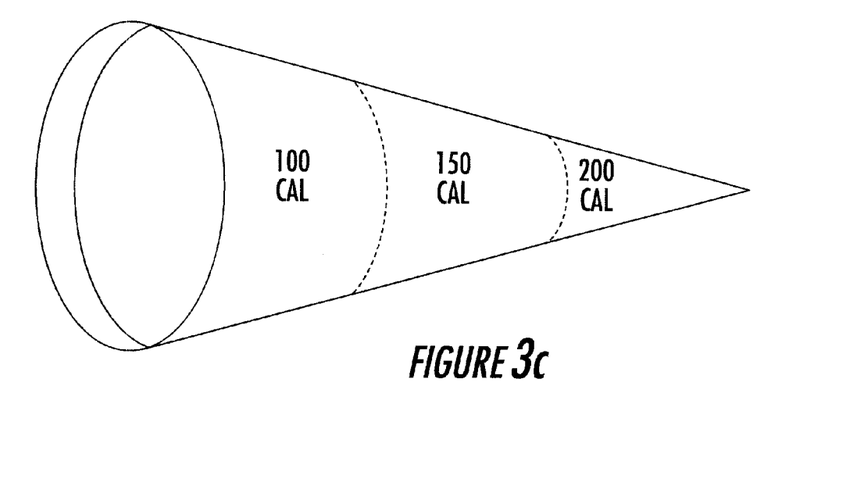
Figure 3D:
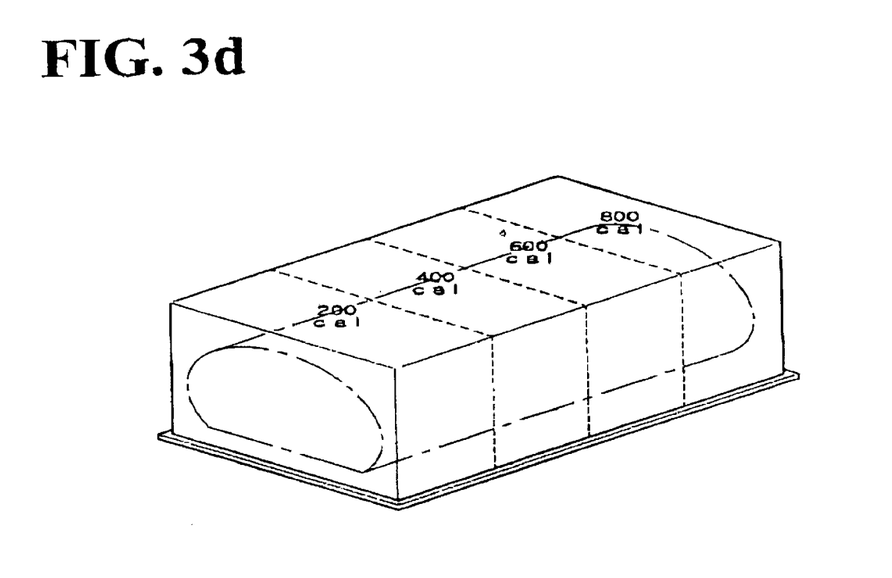

FIG. 3c is a view of an ice-cream cone wrapper, while FIG. 3d is a view of an inner transparent wrapper for roll cake. Such a wrapper of FIG. 3d may be preferably used for wrapping bread, rice cake, hamburgers, sausages, sugar cubes, or a lunch-basket. A lunch-basket wrapped with such a wrapper is shown in FIG. 3f.

Figure 3E:
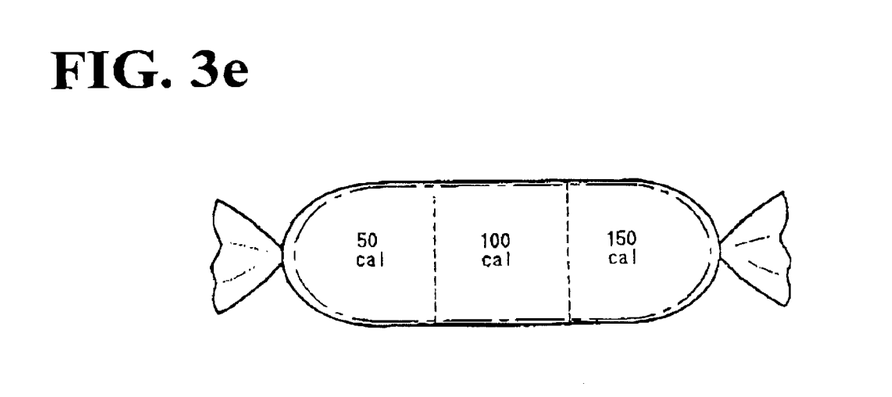
Figure 3F:
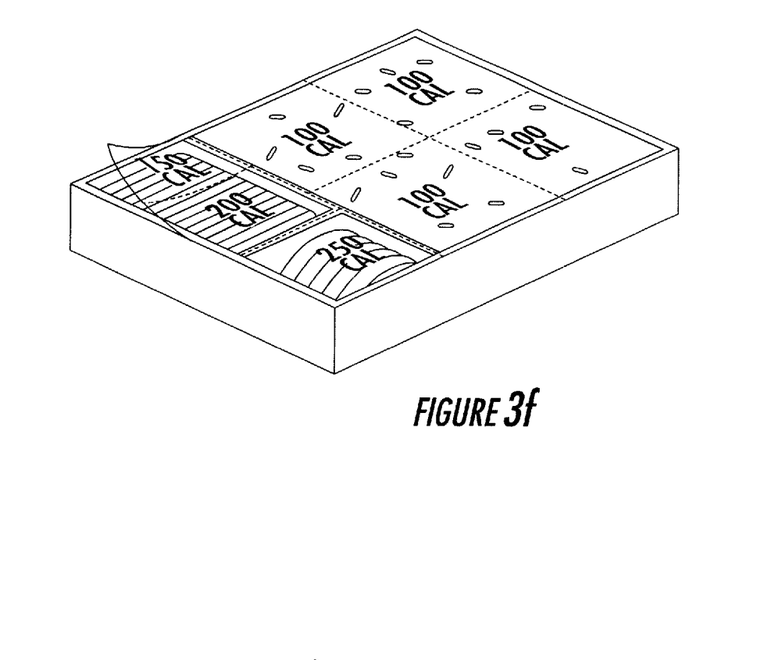

FIG. 3d is a view showing a wrapper for roll cake, while FIG. 3e is a view showing a wrapper for length of candy.

Figure 4A:
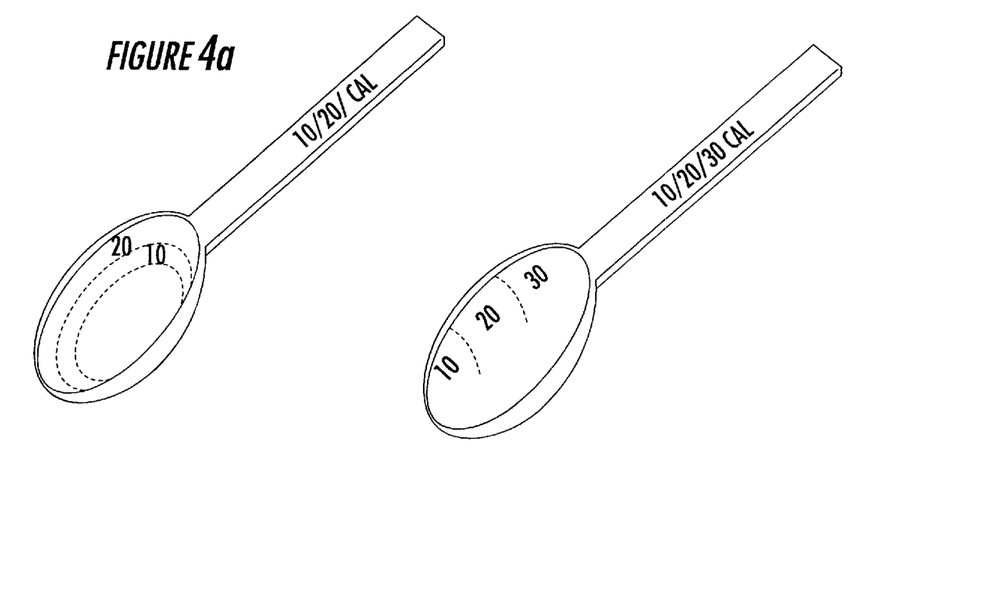
FIGS. 4a to 4e are views, showing a variety of containers for liquid food products individually having a calorie scale on a sidewall.
Figure 4B:
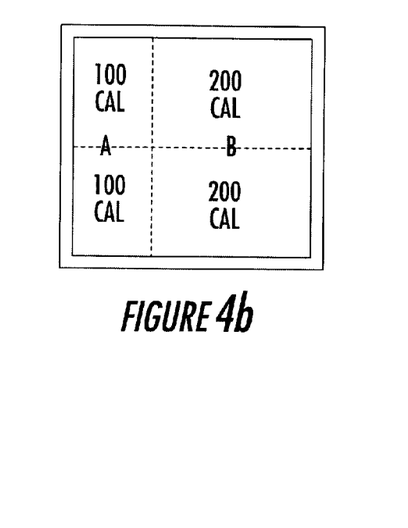
Figure 4C:
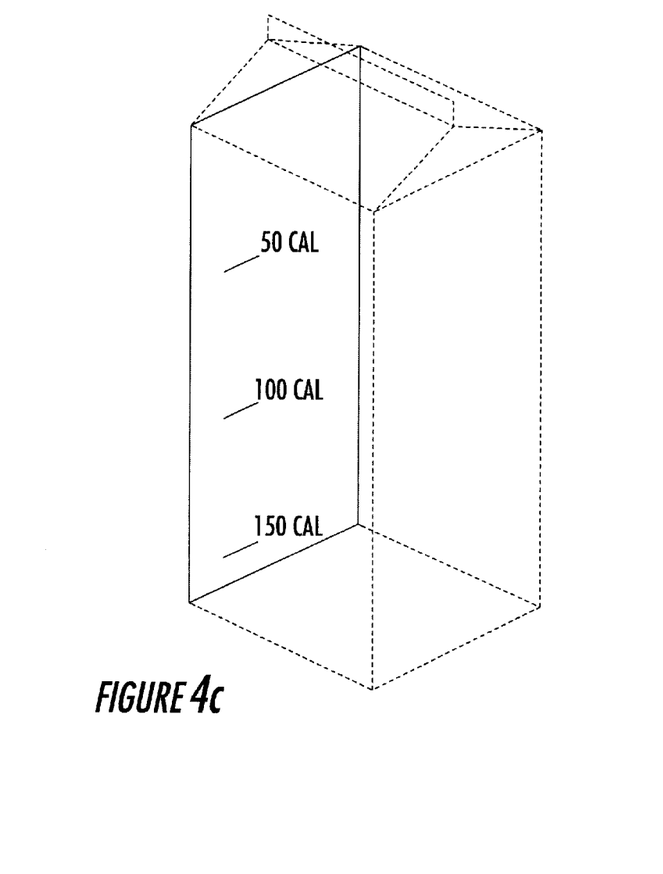

FIGS. 4a to 4e are views, showing a variety of containers for liquid food products, such as syrup, liquor or juice, individually having a calorie scale on a sidewall in accordance with the fourth embodiment of this invention. FIG. 4a shows an ice-cream spoon having a calorie scale in accordance with the first modification of the fourth embodiment. FIG. 4b shows an ice-cream cone wrapper in accordance with the second modification of this embodiment. In this modification, the ice-cream cone is thermally and preliminarily sectioned into several parts, thus allowing people to easily and precisely know how many calories they are consuming per portion of the ice-cream cone. FIG. 4c is a view of a carton pack for milk in accordance with the third modification of this embodiment, with a calorie scale being provided on the surface of a sidewall of the pack and calorie content indicators of, for example, 50 calories, 100 calories, 150 calories, and etc., being expressed on the scale, thus allowing people to easily and precisely know how many calories they are consuming when drinking the milk.

Figure 4D:
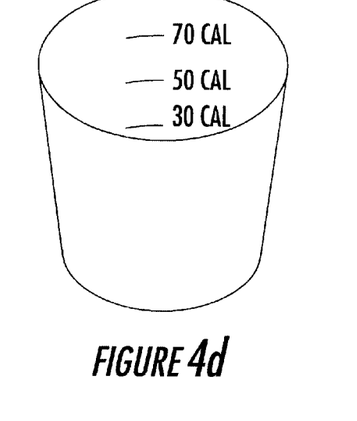
Figure 4E:
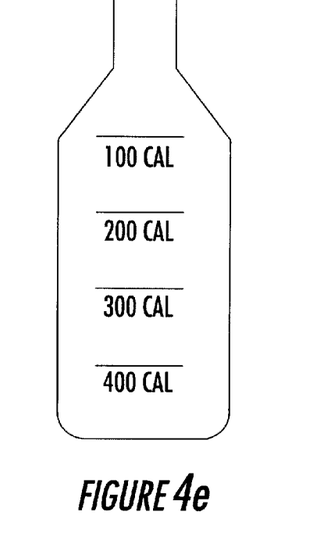

FIG. 4d is a view of a cup with a calorie scale being provided on its sidewall in accordance with the fourth modification of the fourth embodiment, with calorie content indicators of, for example, 70 calories, 50 calories, and etc., being expressed on the scale, thus allowing people to easily and precisely know how many calories they are consuming when partaking of a liquid food product contained in the cup. On the other hand, FIG. 4e is a view of a bottle for liquid food products in accordance with the fifth modification of the fourth embodiment, with a calorie scale being interiorly or exteriorly provided on its sidewall and calorie content indicators being expressed on the scale, thus allowing people to easily and precisely know how many calories they are consuming when partaking of a liquid food product contained in the bottle.

Figure 5:
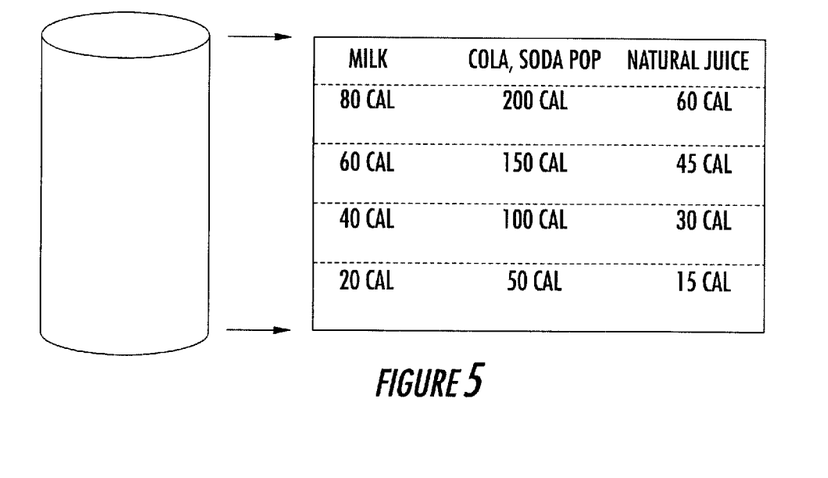
FIG. 5 is a view, showing a cup with a calorie scale on its sidewall.
Figure 6A:
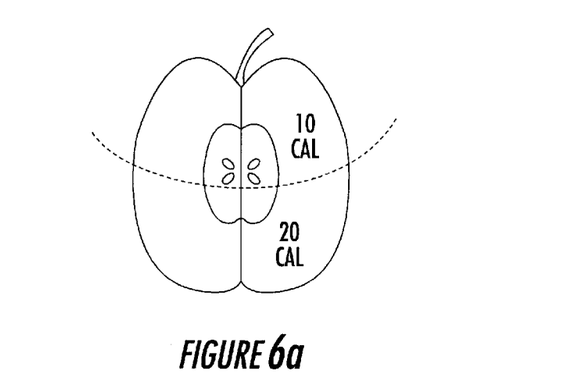
FIGS. 6a to 6d are views, showing a variety of raw food products, packed with transparent plastic films or wrappers and having a plurality of dotted, dashed, or otherwise segmented lines indicating specific portion sizes of each wrapped product, thus allowing people to easily and precisely know how many calories they are consuming per portion of the food product.
Figure 6B:
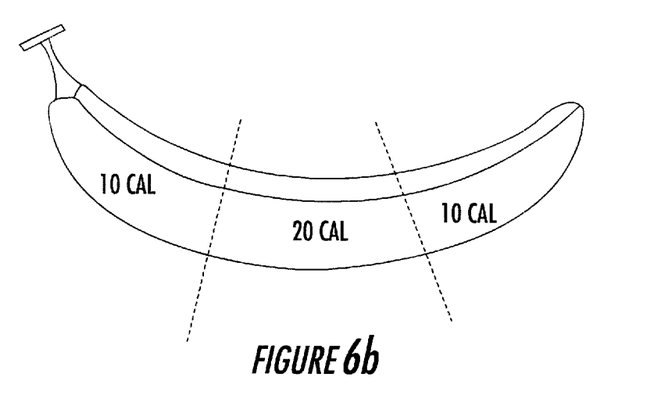
Figure 6C:
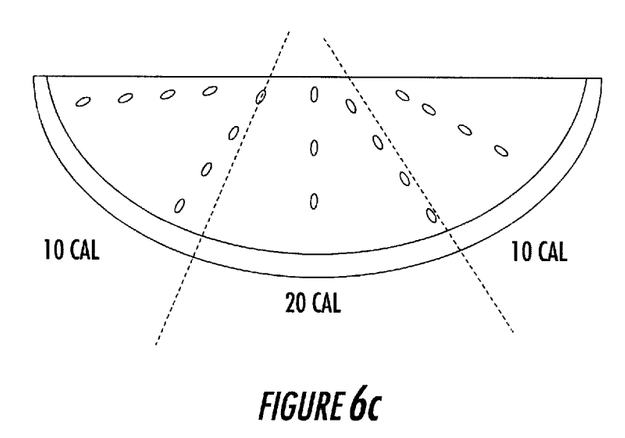
Figure 6D:
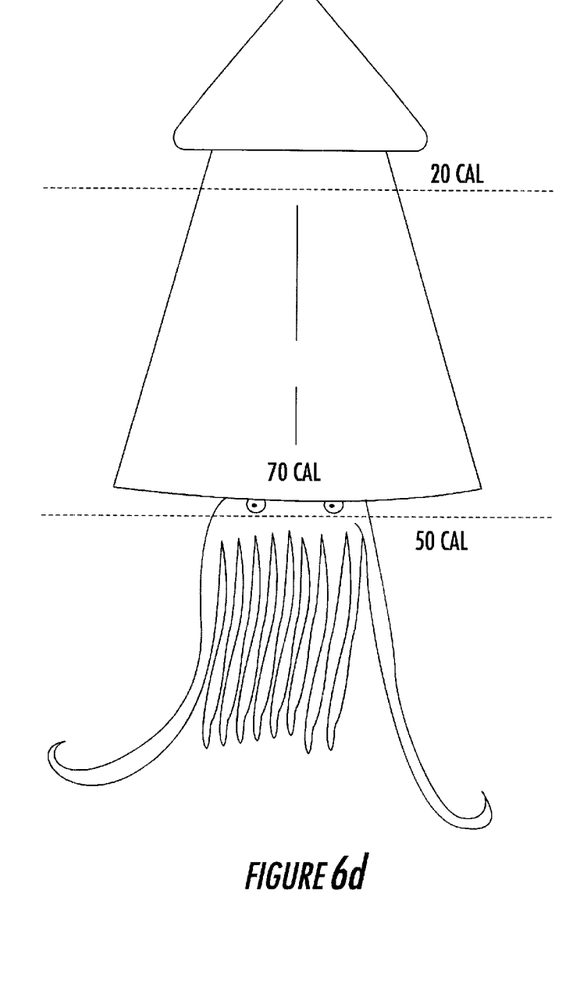

FIG. 5 is a view, showing a cup with a calorie scale on its sidewall in accordance with the fifth embodiment of this invention. In this embodiment, the scale is interiorly or exteriorly provided on the sidewall of the cup with calorie content indicators being expressed on the scale.

In this embodiment, the calorie scale of the cup indicates that milk contains 80 calories, cola or soda pop contains 200 calories, and natural juice contains 60 calories when they are filled in the cup to reach the highest level of the scale.

FIGS. 6a to 6d are views, showing a variety of raw food products, such as apples, bananas, watermelon, dried squid, packed with transparent plastic films or wrappers, the films or wrappers individually having a plurality of dotted, dashed, or otherwise segmented lines indicating specific portion sizes of each wrapped product in accordance with the sixth embodiment of this invention, thus allowing people to easily and precisely know how many calories they are consuming per portion of the food product.

It should be understood that the present invention may be also preferably used for packaging or containing livestock feed in place of human food products without affecting the functioning of this invention.

As described above, the present invention provides a method and package for packing food products with a calorie-division indicating function. This is specifically suitable for some people on a calorie-limitrophic program or a diet program due to obesity, diabetes, hypertension and etc. In the present invention, calorie-divided portions are indicated on a food product by forming calorie divided-portion lines on the product and/or on a package for food products. This finally allows people to easily and precisely know how many calories they are consuming per portion of the food product. Therefore, the method and package of this invention is specifically and preferably used for packaging dietary/health food products. Another advantage of this invention resides in that it provides a new packaging culture to the food industry.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A package of food products comprising:
   a plastic wrapper having a plurality of perforated lines to delineate a plurality of portions of said wrapper and its respective portion of said food products contained in said wrapper, said wrapper further having a number of calories indicated on each of said portions of said wrapper which indicate the calorie content of each of said respective portion of said food product, wherein said plastic wrapper is selectively breakable on said perforated lines to remove both one of said portions of said wrapper and a portion of said food products under the broken plastic wrapper.

2. The package of claim 1, wherein the plastic wrapper is transparent.

3. The package of claim 1, wherein said number of calories is a total calorie content of one or more of said portions.

4. A method of packaging food products comprising the steps of:
   providing a package formed of a plastic wrapper;
   sectioning a surface of said package with a plurality of perforated lines to form a plurality of portions;
   indicating a number of calories on each of a said portions of said wrapper which indicate the calorie content of a portion of a food product respective to each of said portion of said wrapper;
   applying said plastic wrapper to said food product;
   and breaking said wrapper along said plurality of perforated lines to remove both one of said portions of said wrapper and its respective portion of said food product whereby providing selective intake of food products according to calorie content.

5. The method of claim 4, wherein said plastic wrapper is transparent.

6. The method of claim 4, wherein said number of calories is a total calorie content of one or more of said portion.

* * * * *